United States Patent [19]

Nelson

[11] Patent Number: 4,739,671
[45] Date of Patent: Apr. 26, 1988

[54] TAPERED WORM
[75] Inventor: Bertel S. Nelson, Naperville, Ill.
[73] Assignee: Wedgtrac Corporation, Naperville, Ill.
[21] Appl. No.: 819,396
[22] Filed: Jan. 16, 1986

Related U.S. Application Data

[63] Continuation-in-part of Ser. No. 668,196, Nov. 5, 1984, Pat. No. 4,630,497.

[51] Int. Cl.⁴ .............................................. F16H 1/16
[52] U.S. Cl. ........................................ 74/425; 74/458
[58] Field of Search ........................ 74/425, 427, 458

[56] References Cited

U.S. PATENT DOCUMENTS

| | | | |
|---|---|---|---|
| 486,318 | 11/1892 | Albro | 74/458 |
| 1,759,968 | 5/1930 | Trbojevich . | |
| 2,273,784 | 2/1942 | Kahl | 74/458 |
| 2,369,599 | 2/1945 | Morrison | 74/425 |
| 2,868,031 | 1/1959 | Schumb . | |
| 3,006,211 | 10/1961 | Mueller | 74/409 |
| 3,106,103 | 10/1963 | Smith . | |
| 3,402,619 | 9/1968 | Thurley et al. | 74/425 |
| 4,047,449 | 9/1977 | Popov | 74/425 |
| 4,220,053 | 9/1980 | Barlow et al. . | |

Primary Examiner—Andrew V. Kundrat
Assistant Examiner—Peter M. Cuomo
Attorney, Agent, or Firm—Robert M. Wolters

[57] ABSTRACT

A worm and meshing worm gear are provided. The worm has oppositely tapered frustoconical portions at either end thereof. The angle of taper of the two tapered portions is the same, but in different directions. The angle of taper is substantially equal to 360 degrees divided by the number of teeth in the worm gear. Contact between the worm and gear occurs over a plurality of teeth as contrasted with substantially only one tooth in the conventional cylindrical worm. The worm is capable of being formed by thread rolling.

2 Claims, 4 Drawing Sheets

TAPERED WORM

This application is a continuation-in-part of application Ser. No. 668,196, filed Nov. 5, 1984, now U.S. Pat. No. 4,630,497.

BACKGROUND OF THE INVENTION

Worm gearing is well known and is used in installations where a driving shaft and a driven shaft must be at right angles to one another. The worm is of cylindrical outline in simplest form and has one or more thread turns or spiral teeth thereon. A meshing worm gear has a plurality of apppropriately twisted teeth having tooth flank surfaces, generally of an involute curved shape, which are conjugate to the worm.

The instantaneous contact between a worm and a worm gear is at a rather limited area where the worm is tangent to the gear. The area of contact is quite limited, generally being along a full ine on one tooth and a very short line on an adjacent tooth. Consequently, only a limited amount of power can be transmitted between a worm and worm gear.

Efforts have been made to provide greater contact between a worm and a worm gear and thereby to permit greater transmission of power by shaping the worm somewhat in the nature of an hourglass. Manufacture of such worms is quite a complicated process, requiring precise control of the relative positions of the worm blank and of a cutting tool as the worm blank it turned. It is not possible to form hourglass worms by a thread rolling process as is possible with straight worms.

OBJECTS AND SUMMARY OF THE PRESENT INVENTION

It is an object of the present invention to provide an improved worm and gear having many of the advantages of an hourglass worm and gear, but capable of being produced by a thread rolling process.

It is a further object to provide a worm having only two conical portions each of straight taper, the worm having no center cylindrical section.

In my copending application Ser. No. 668,196, filed Nov. 5, 1984, now U.S. Pat. No. 4,630,497, I provide a worm having a central cylindrical section, i.e., a straight section. At either end thereof and symmetrically disposed relative thereto, I provide tapered sections which allow the worm substantially to envelop the gear and to provide tooth contact at several locations spaced axially of the worm, rather than at one or two sections as on a conventional straight worm. The angle of taper is equal to 360 degrees divided by the number of teeth in the gear, or an integer multiple of such number. For example, for 26 teeth, the angle would be 360 degrees divided by 26 equals 13.846 degrees. It could also be 27.692, etc. The lead of the thread in the cone areas is that of the central lead times the cosine of the taper angle.

In accordance with the present invention only the straight taper opposite cone sections are provided. There is no intermediate cylindrical portion to the worm. Although this leaves less teeth in contact, it provides for a smoother action in having two adjacent teeth approximately 180 degrees out of phase. Furthermore, it permits designing to shorter or stubbier worm and gear teeth which are individually stronger than is possible with the worm having a center cylindrical section. Therefore, the total load carrying capacity is somewhat higher than with the first form of the invention having the center cylindrical section to the worm, and it is much higher than that of a conventional cylindrical worm and meshing gear. A worm having the two straight taper conical end portions with no intervening center cylindrical portion simplifies the manufacture of worm thread rolling dies, whereby the worm is simple and less expensive to produce.

THE DRAWINGS

DETAILED DISCLOSURE OF THE ILLUSTRATED EMBODIMENT

Figure 1:
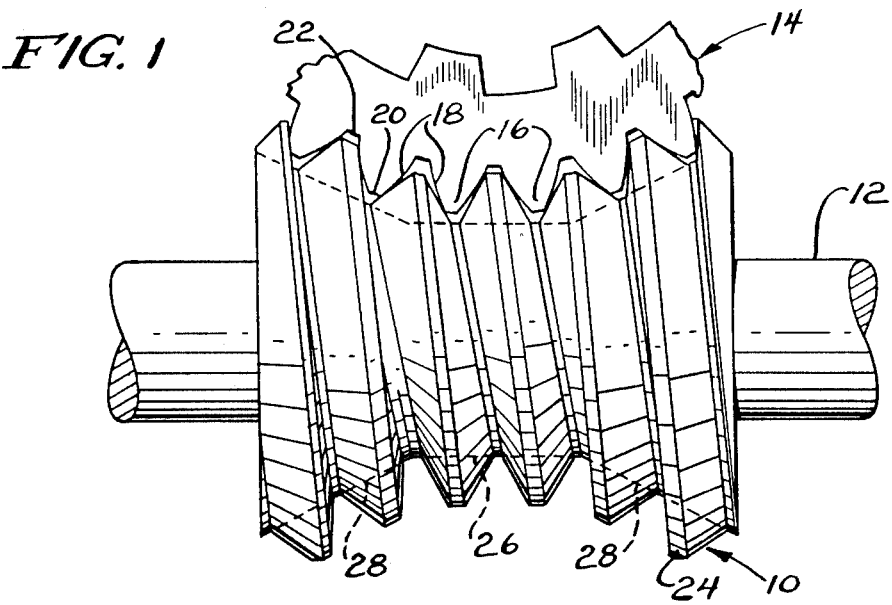
FIG. 1 is an elevational view of a worm and gear constructed in accordance with the principles of the present invention.
Figure 2:
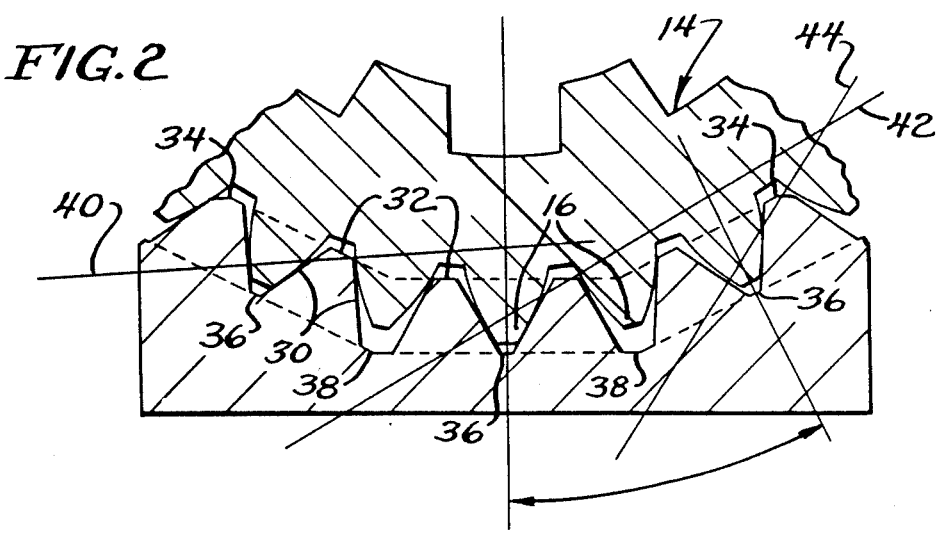
FIG. 2 is a fragmentary sectional view taken along the axis of the worm and showning contact of the worm with the gear in one position of operation.
Figure 3:
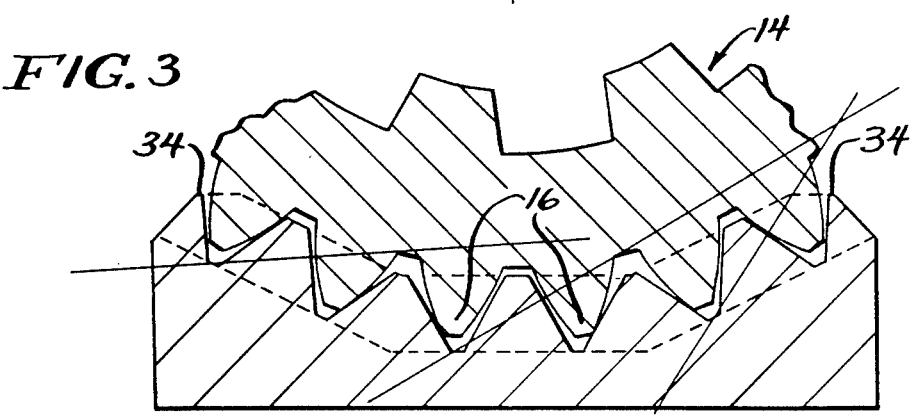
FIG. 3 is a view similar to FIG. 2 with a worm rotated 180 degrees.

Turning now in greater detail to the figures of the drawings, and first to FIGS. 1–3, there will be seen a worm 10 fixed on a shaft 12 and meshing with a worm gear or worm wheel 14. The worm wheel is of substantially conventional design having a plurality of teeth 16 having curved flanks or working surfaces 18, substantially flat crests 20, and substantially flat valleys 22. The teeth are preferably slightly twisted to accommodate to the lead of the thread of the worm 10, as is known in connection with worm and wheel gearing.

The worm 10 is provided with a single lead or thread 24 extending from one end to the other thereof. The worm comprises three sections, each of which is straight. The first or center section 26 as indicated by the broken line is cylindrical and the thread through this area is conventional. At either end of the center cylindrical section 26 are tapered sections indicated by the broken lines 28. The taper angles are equal, but in opposite directions. This provides a frustoconical section at either end of the worm. The thread 24 is inclined to conform to the taper of the frustoconical sections 28. The angle of taper as represented by the broken lines 28 is equal to 360 degrees divided by the number of teeth in the gear, or an integer multiple thereof. In the drawings the worm wheel or worm gear 14 has 27 teeth, so the angle of taper is 13.333 degrees. It could also be 26.667, etc. The thread lead in the conical portions of the worm is the same as the lead in the cylindrical central portions times the cosine of the taper angle.

If the taper angle is maintained approximately correct, then the thread is continuous from the central cylindrical section to the tapered portions. There is a discontinuity in the thread form at the intersection between the cylindrical and frustoconical tapered areas.

This occurs at a plane passing through the gear axis at an angle of one-half the taper angle from the plane through the gear axis and perpendicular to the worm axis. This discontinuity of form does not interfere with the tooth mesh action because any portion of the worm thread lying inside of this plane will have the form of the cylindrical section, and any portion outside of this plane will have the form of the tapered cone section. Also, by suitable design, this discontinuity occurs at a portion of the worm which is inactive. That is, there is no contact with the gear tooth in this area.

Turning to the sectional views of FIGS. 2 and 3, the worm being rotated 180 degrees from FIG. 2 to FIG. 3, it will be seen that the flanks or faces of the worm thread 24 are flat at 30. The crest 32 is mainly flat, but is somewhat distorted at the outer positions 34, as may be seen. Likewise, the root or valley 36 is flat both in the cylindrical portion of the worm, and in the tapered frustoconical portions, but is a combination of two flat portions at the juncture 38. The thread bears the same inclinication to the tapered portion as to the cylindrical portion.

The worm, as has been noted previously is of a single lead, and has a right hand thread and rotates in a clockwise direction as viewed from the right side of the drawing. There is a low pressure angle line of action 40 between the left frustoconical worm portion 28 and gear teeth 16 meshing therewith. There is also a central line of action 42 between the worm thread in the central, cylindrical portion of the worm, and there is also a high pressure angle line of action 44 between the thread in the right tapered or frustoconical portion of the worm and corresponding gear teeth.

The angle of the taper cone can vary somewhat from the the theoretical angle heretofore set forth, i.e., 360 degrees divided by the number of gear teeth, and still obtain the desired advantage which is that three times the number of teeth will be in contact as the number of contacting teeth in a conventinal cylindrical worm. Consequently, the load carrying capacity is greatly increased and is generally equivalent to the so called hourglass or double enveloping type of worm and gear. It has the distinct advantage over the hourglass type in that the worm thread can be thread rolled, which is a high production, low cost manufacturing process. I have been advised that at the present state of the art the hourglass worm cannot be thread rolled, and is extremely expensive to produce.

Accordingly, a worm constructed in accordance with FIGS. 1–3 has significantly increased load transferring capacity as compared with a conventional cylindrical worm, and it can be manufactured at substantially the same cost as the cylindrical worm, substantially less than the cost of manufacturing an hourglass worm.

The specific example of the invention as heretofore shown and described is for illustrative purposes only. Specifically, it is noted that two taper sections (at say 13.846 degrees and 27.692 degrees for the 26 tooth gear example) could be used at each side of the cylindrical section. If the gear had a relatively large number of teeth such as 60 or 80, then even three or four taper sections might be used at each side of the cylindrical section.

Figure 4:
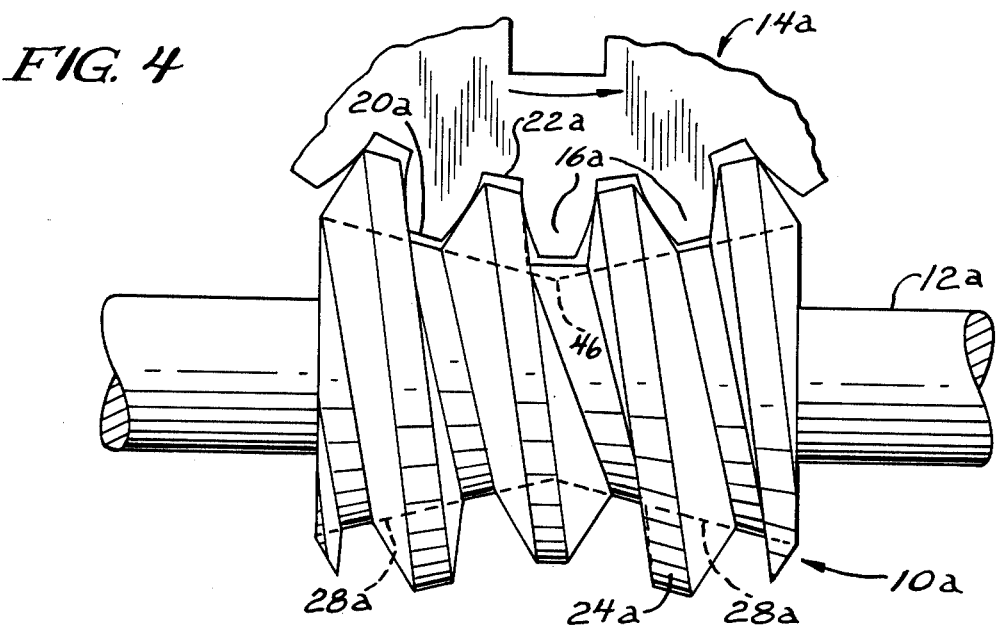
FIG. 4 is an elevational view of a worm and gear showing a modification of the invention in which there is no cylindric central section.
Figure 5:
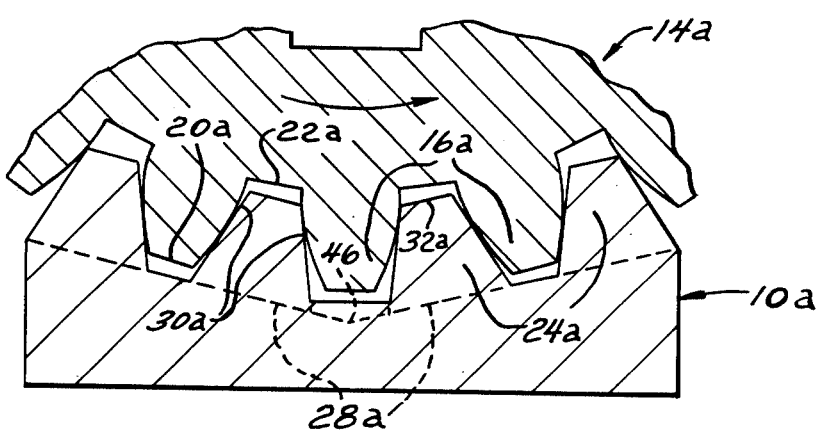
FIG. 5 is an enlarged view of an axial section of the worm and gear of FIG. 4.
Figure 6:
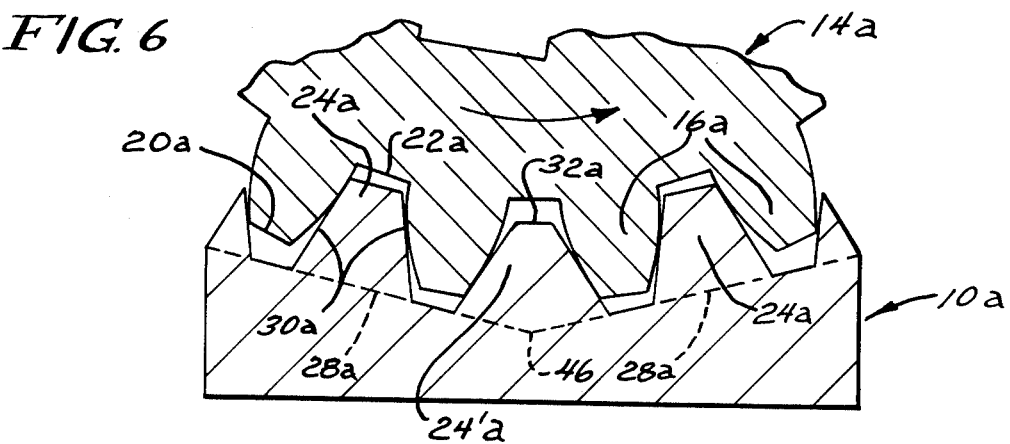
FIG. 6 is a view similar to FIG. 5 after the worm has rotated approximately 180 degrees.
Figure 7:
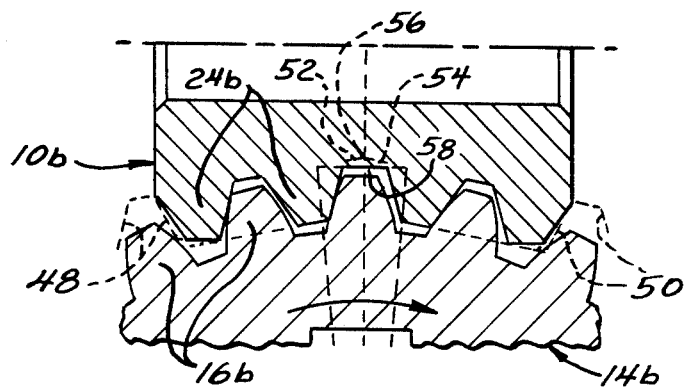
FIG. 7 is a view similar to FIG. 5 on a somewhat reduced scale and relatively inverted showing a practical form of the invention of FIGS. 4–6.
Figure 8:
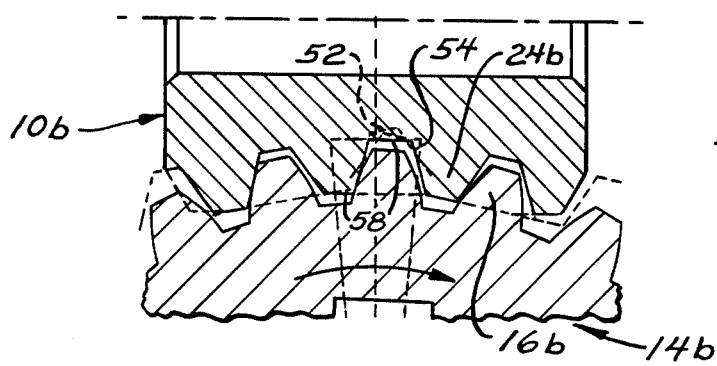
FIGS. 8–14 are views similar to and corresponding with FIG. 7 and sequentially at 45 degrees increment of rotation of the worm.
Figure 9:
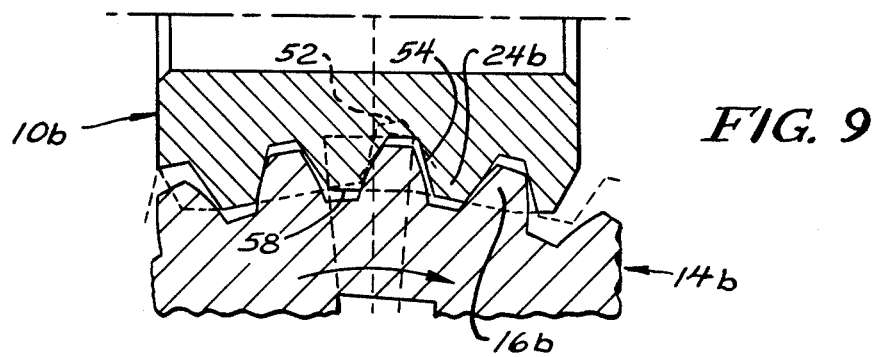
Figure 10:
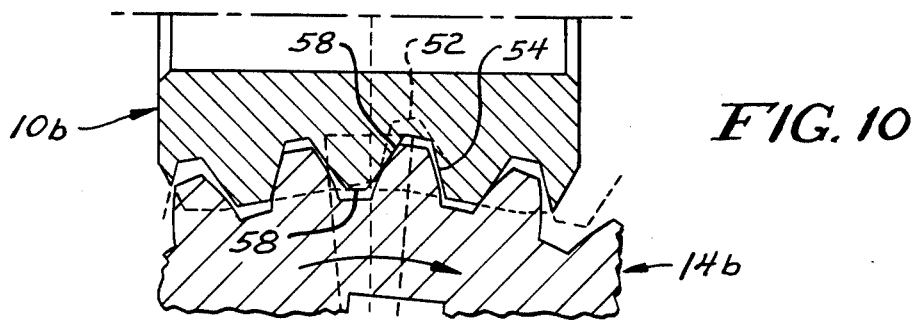
Figure 11:
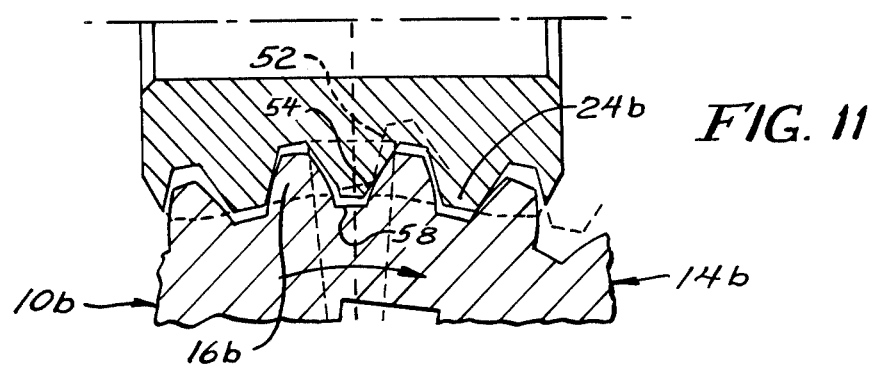
Figure 12:
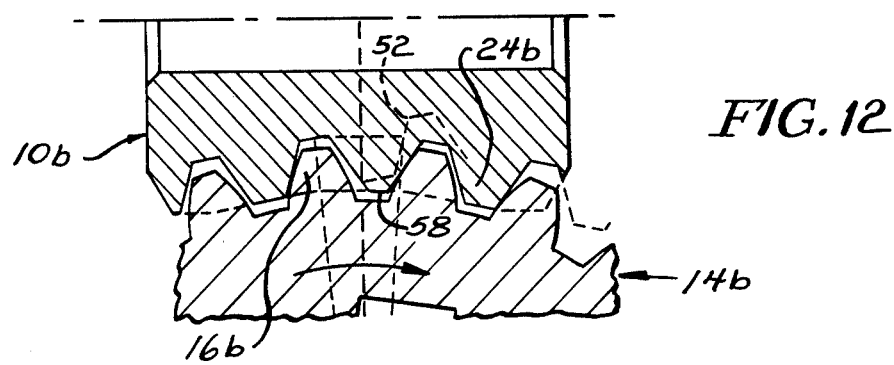
Figure 13:
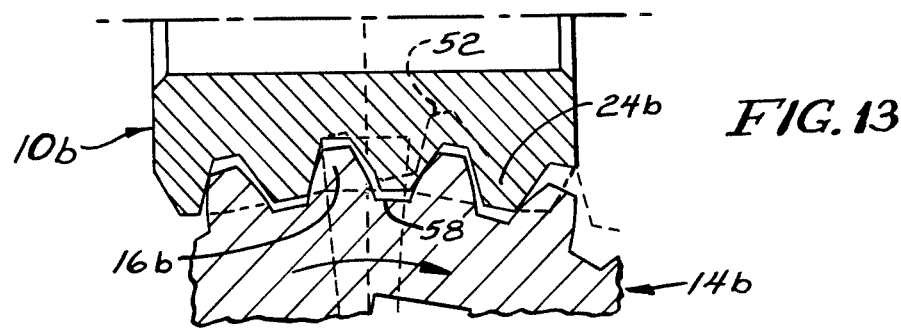
Figure 14:
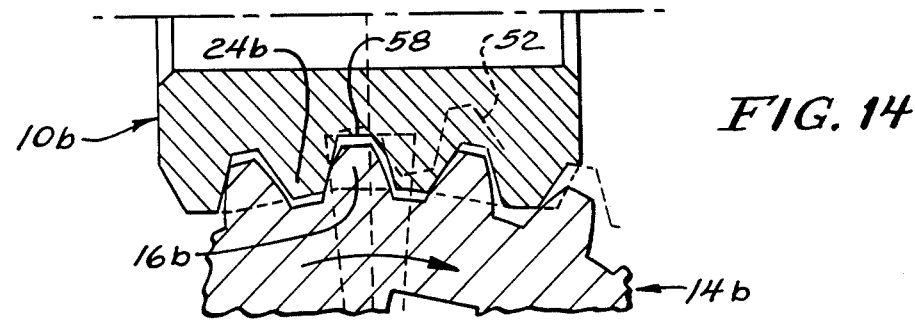

Attention should now be directed to FIGS. 4–6 wherein there is shown the present invention utilizing the tapered end portions of the worm, but without the center cylindrical portion of FIGS. 1–3. Similar parts are numbered with the same numbers as used heretofore with the addition of the suffix a, thereby avoiding the necessity of duplication of disclosure. It will be noted that there are a left-hand frustoconical worm end, and a right-hand frustoconical worm end, the taper at the roots being indicated on both sides by the numeral 28a. The frustoconical tapers meet at an apex or ring 46. The worm thread on each frustoconical section is uniform as in the previous embodiment of the invention, and there is a discontinuity or irregularity at the ring or apex 46 as indicated at 24'a in FIG. 6.

For purposes of illustration a right-hand thread is shown on the worm, and clockwise rotation as viewed from the right end of FIG. 4 is assumed. This causes the worm gear 14a to rotate counterclockwise as indicated by the arrow in the drawings. FIG. 6 is taken at about 180 degrees of rotation past the position of FIG. 5.

A practical embodiment of the invention showing the double taper only is shown in FIGS. 7–14, which are similar to one another, but taken at successive positions of the worm at 45 degree increments of rotation. Similar parts are identified by similar numerals with the addition of the suffix b. A different suffix is used relative to the suffix used in FIGS. 4–6 since there are detailed distinctions, even though the basic structure is the same. For example, the thread 24b is of less radial extent, and the gear teeth 16b are more stubby than in FIGS. 4–6. This results in stronger teeth and a stronger worm, whereby greater force can be transmitted. The outline of the two tapers of the worm thread is extended at the left end of the worm at 48, and at the right end at 50. It will be seen that the actual worm is cut back or chumpfered slightly as to the diameter of the ends thereof, and also as to the outer faces. The cut back portions would not in any event effect any force transfer, and thus are eliminated to save material and to simplify thread rolling.

The outline of the left thread is continued at 52, and of the right thread is continued at 54, the two intersecting at 56. The actual root of the worm thread in this area is cut back at 58 resulting in a greater amount of material at this diametrically minimal part of the worm, thereby materially enhancing the strength of the worm. As will be seen by studying the successive views of FIGS. 7–14, taken at 45 degree increments of rotation of the worm, as previously noted, the meeting of the thread extensions 52 and 54 differs somewhat about the circumference of the worm, but in any event resulting in more material being incorporated in the worm than might be anticipated.

It further will be seen by comparing the various FIGS. 7–14 that the progression of driving contact of the worm with the worm gear differs from tooth to tooth so that there is a smooth transition of force transmitted with lack of discontinuities so that maximum force can be transmitted for the size of the worm and of the gear.

In the form of the invention illustrated in FIGS. 3–6, and particularly in FIGS. 7–14 overall tooth action is smoothed out and permits designing to shorter or stubbier worm and gear teeth which are individually stronger than in the form of the invention disclosed in FIGS. 1–3. Thus a greater load can be carried by the form of the invention illustrated in FIGS. 4–14 as contrasted with the form of the invention in FIGS. 1–3, and all forms herein can carrying much greater load than the conventional cylindrical worm and mating gear. In the form of the invention disclosed in FIGS. 4–14 the worm is simpler, thus leading to simplified manufacture of worm thread rolling dies. The resulting structure therefore is less expensive.

It is desirable to have tooth contact approximately 180 degrees out of phase. If 26 gear teeth are taken as exemplary, then 360 degrees divided by 26 equals 13.85 degrees; thus 13.85 degrees taper will give simultaneous tooth action on both tapered sections. If ¾ of this is taken arbitrarily, i.e., 10.39 degrees taper will result in tooth action 180 degrees apart on the two tapered sections. As a specific example, reference to FIG. 7 reveals that the second tooth on the left engages near the tip, and the second tooth on the right engages near the root. There is other tooth engagement, but it is the 180 degrees phasing of the teeth spaced at two that is important in giving a smooth action.

In the interest of strength, the contact ratio is near 1. The contact ratio is the length of the line of action divided by the line of pitch. This ratio can go to 3 or 4 with fine teeth. Coarser teeth allow the ratio to get down to 1. This gives maximum strength but not as smooth action. However, the 180 degrees phasing gives a smooth action, similar to a contact ratio of 2.

Various other changes in structure will no doubt occur to those skilled in the art, and will be understood as forming a part of the present invention insofar as they fall within the spirit and scope of the appended claims.

The invention is claimed as follows:

1. A worm and a gear meshing therewith, said worm comprising a first tapered rectilinear frustoconical portion at one end of said worm, a second tapered rectilinear frustoconical portion at the other end thereof immediately adjacent thereto and tapered oppositely to the first portion and fixed relative thereto, and a worm thread extending over both of said tapered portions, said oppositely tapered frustoconical portions being integral with each other and meeting one another with substantially no intervening portion, said worm thread having a common driving face thereon and extending across both of said rectilinear frustoconical portions, and said gear having a succession of teeth thereon having corresponding driven surfaces, a plurality of gear teeth driven faces being simultaneously drivingly engaged by said driving face of said worm thread on both of said frustoconical portions.

2. A worm gear as set forth in claim 1 wherein said frustoconical portions each have an equal but opposite taper angle, the angle being such that gear teeth spaced by teeth are engaged by said worm thread driving face on both of said frustoconical portions 180 degrees out of phase.

* * * * *